US006929162B1

(12) United States Patent
Jordan (10) Patent No.: US 6,929,162 B1
(45) Date of Patent: Aug. 16, 2005

(54) AUTOMATIC LOCKING LADDER RACK (76) Inventor: Lawrence R Jordan, 7000 N. Main, Lot #9, Jacksonville, FL (US) 32208

( * ) Notice: Subject to any disclaimer, the term of this patent is extended or adjusted under 35 U.S.C. 154(b) by 0 days.

(21) Appl. No.: 10/436,565

(22) Filed: May 13, 2003

Related U.S. Application Data (60) Provisional application No. 60/379,924, filed on May 13, 2002.

(51) Int. Cl.[7] .......................... B60R 9/042; B60R 9/048
(52) U.S. Cl. ................ 224/282; 224/42.37; 224/42.38; 224/315; 224/321; 224/324; 224/570
(58) Field of Search .......................... 224/42.37, 42.38, 224/315, 317, 282, 321, 324, 495, 502, 524, 224/525, 530, 536, 570; 280/769; 414/462

(56) References Cited

U.S. PATENT DOCUMENTS

| 3,722,766 | A | * | 3/1973 | Barrineau et al. | .......... 224/324 |
|---|---|---|---|---|---|
| 3,963,136 | A | * | 6/1976 | Spanke | ........................ 414/462 |
| 4,390,117 | A | * | 6/1983 | Fagan | ......................... 224/324 |
| 4,618,083 | A | * | 10/1986 | Weger, Jr. | .................... 224/324 |
| 4,751,981 | A | * | 6/1988 | Mitchell et al. | ............ 224/405 |
| 4,827,742 | A | * | 5/1989 | McDonald | ................... 224/315 |
| 5,104,280 | A | * | 4/1992 | Ziaylek et al. | .............. 414/462 |
| 5,186,588 | A | * | 2/1993 | Sutton et al. | ............... 224/315 |
| 5,242,094 | A | * | 9/1993 | Finley | ......................... 224/324 |
| 5,791,857 | A | * | 8/1998 | Ziaylek, Jr. et al. | ........ 414/462 |
| 6,135,686 | A | * | 10/2000 | Chasen | ........................ 224/324 |

* cited by examiner

Primary Examiner—Gary E. Elkins
(74) Attorney, Agent, or Firm—Jeffrey C. Maynard (57) ABSTRACT

An apparatus for locking a ladder to a vehicle mounted carrier. The apparatus includes a platform assembly to which a ladder is mounted. The platform assembly includes a plurality of v-notch shaped clips that are positioned to grasp rungs of the ladder. The clips are curved in a similar shape to the claw end of a hammer and biased in a direction to hold the ladder firmly on the vehicle carrier.

12 Claims, 9 Drawing Sheets

FIG. 1

PLATFORM - PLAN
FIG. 2

FIG. 3

PLATFORM - LOCKED POSITION

PLATFORM - RAISED POSITION

AUTOMATIC LOCKING LADDER RACK

CROSS REFERENCE TO RELATED APPLICATION

This Application claims the benefit of U.S. Provisional Application Ser. No. 60/379,924 entitled *Automatic Locking Ladder Rack*, filed with the U.S. Patent and Trademark Office on May 13, 2002.

BACKGROUND OF THE INVENTION

1. Field of the Invention

This invention relates generally to racks for carrying equipment on vehicles, and more particularly to an apparatus for holding and locking a ladder to a vehicle carrier.

2. Background of the Prior Art

Current apparatuses for transporting ladders on vehicles require ropes, tie-downs or bungee cords to secure the ladder to the carrier rack. It is not uncommon for the ropes and tie-downs to break, causing the ladder to come loose and fall from the carrier rack resulting in equipment damage. It is especially dangerous for a ladder to fall while the vehicle is in motion on the highway, since such ladder can interfere with other vehicles on the highway resulting in accidents and death.

Consequently, there exists an unfulfilled need for an apparatus to simply and securely hold a ladder to a carrier rack. Such apparatus should be easy to operate and sturdy enough to prevent a ladder from release until desired.

SUMMARY OF THE INVENTION

The present invention provides such an apparatus and process for securely attaching a ladder to a carrier rack. Specifically, the present invention includes a pivoting platform and locking mechanisms that eliminate the need for ropes, straps, or bungee cords to secure ladder to a vehicle roof. The locking mechanisms eliminate the danger of such ropes or straps breaking, allowing the ladder to fall from the vehicle roof thereby causing damage to the vehicle and ladder, and potentially causing traffic accidents as well.

An automatic locking ladder rack according to the present invention is made of three basic components. The first component is a base plate, which can be mounted to the bottom rear of vans and similar vehicles, or inside the tailgate on either side of the bed of a pickup truck. The second component is an adjustable post, to which the base plate attaches, such post having a pivoting platform for attaching a ladder. The platform features several locking clamps that will secure the ladder to the platform. Guide pins on the platform aid in placement and alignment of the ladder for use of the locking devices.

Inside the post will be a lock that secures the platform itself for transport, and which will release for loading and unloading.

An object of the invention is to enable a simple and effective apparatus designed to lock an extension ladder to a carrier rack.

Another object of the invention is to provide a more efficient means for locking a ladder to a vehicle. A related object is to enable locking mechanisms to eliminate the need for ropes, straps or bungee cords to secure such ladder to a vehicle.

Another object of the invention is to enable a pivoting platform with such locking mechanisms to provide a simple apparatus for carrying such ladder on a vehicle.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above may be better understood by referring to the following detailed description, which should be read in conjunction with the accompanying drawings in which like reference numbers are used for like parts. This detailed description of a particular preferred embodiment, set out below to enable one to practice the invention, is not intended to limit the invention, but to serve as a particular example thereof. Those skilled in the art should appreciate that they can readily use the concepts for the apparatus and the specific embodiments disclosed as a basis for modifying or designing other methods and systems for carrying out the same purposes of the present invention. Those skilled in the art should also realize that such equivalent methods and systems do not depart from the spirit and scope of the invention in its broadest form.

Figure 1:
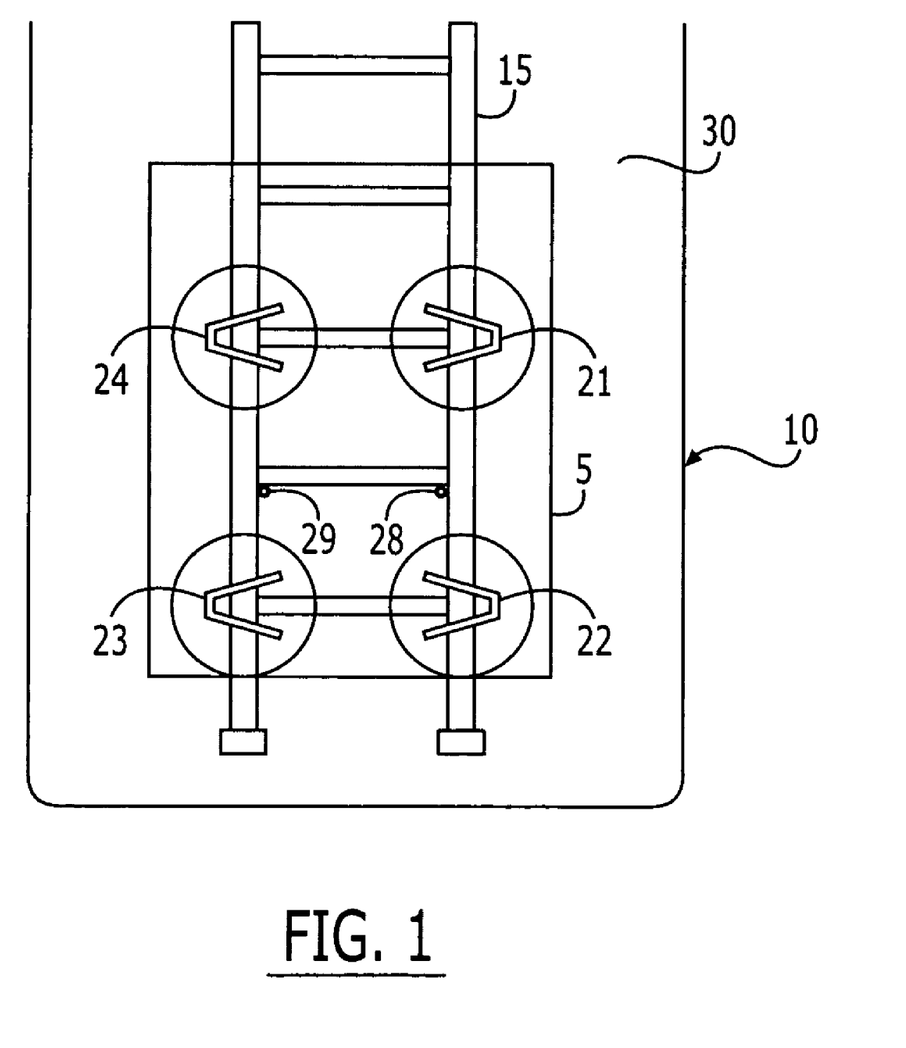
FIG. 1 is a plan view of an assembly of the apparatus according to the present invention.
Figure 2:
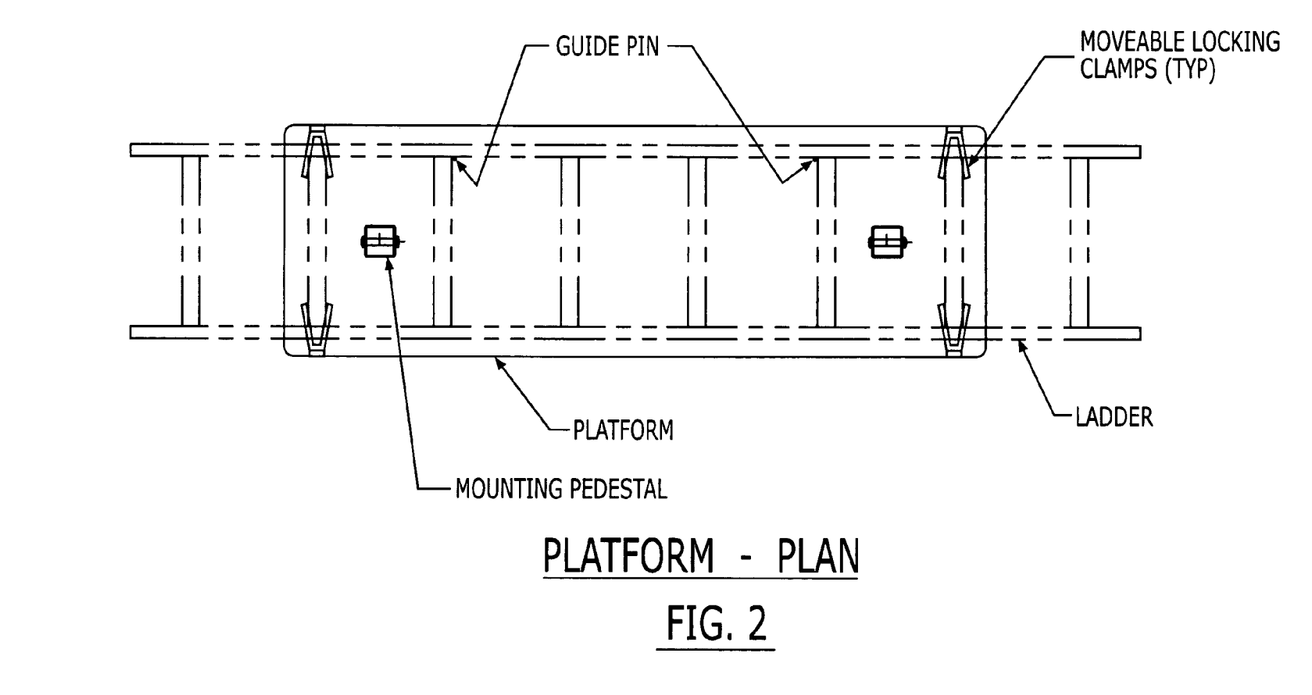
FIG. 2 is a plan view of a platform for the apparatus according to the present invention.
Figure 3:
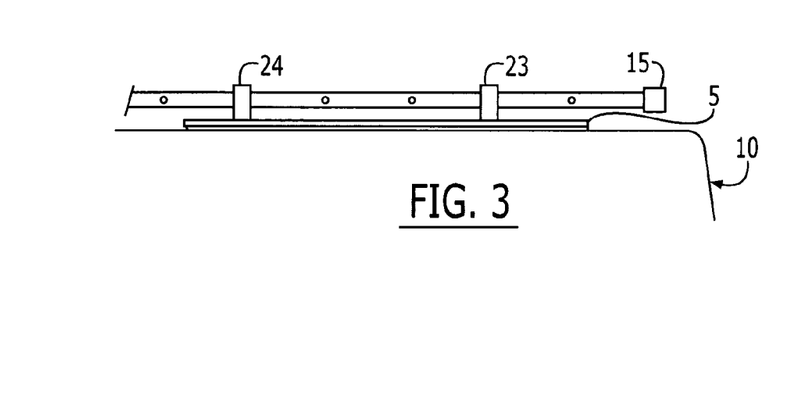
FIG. 3 is a side elevational view of an assembly of the apparatus according to the present invention.
Figure 4:
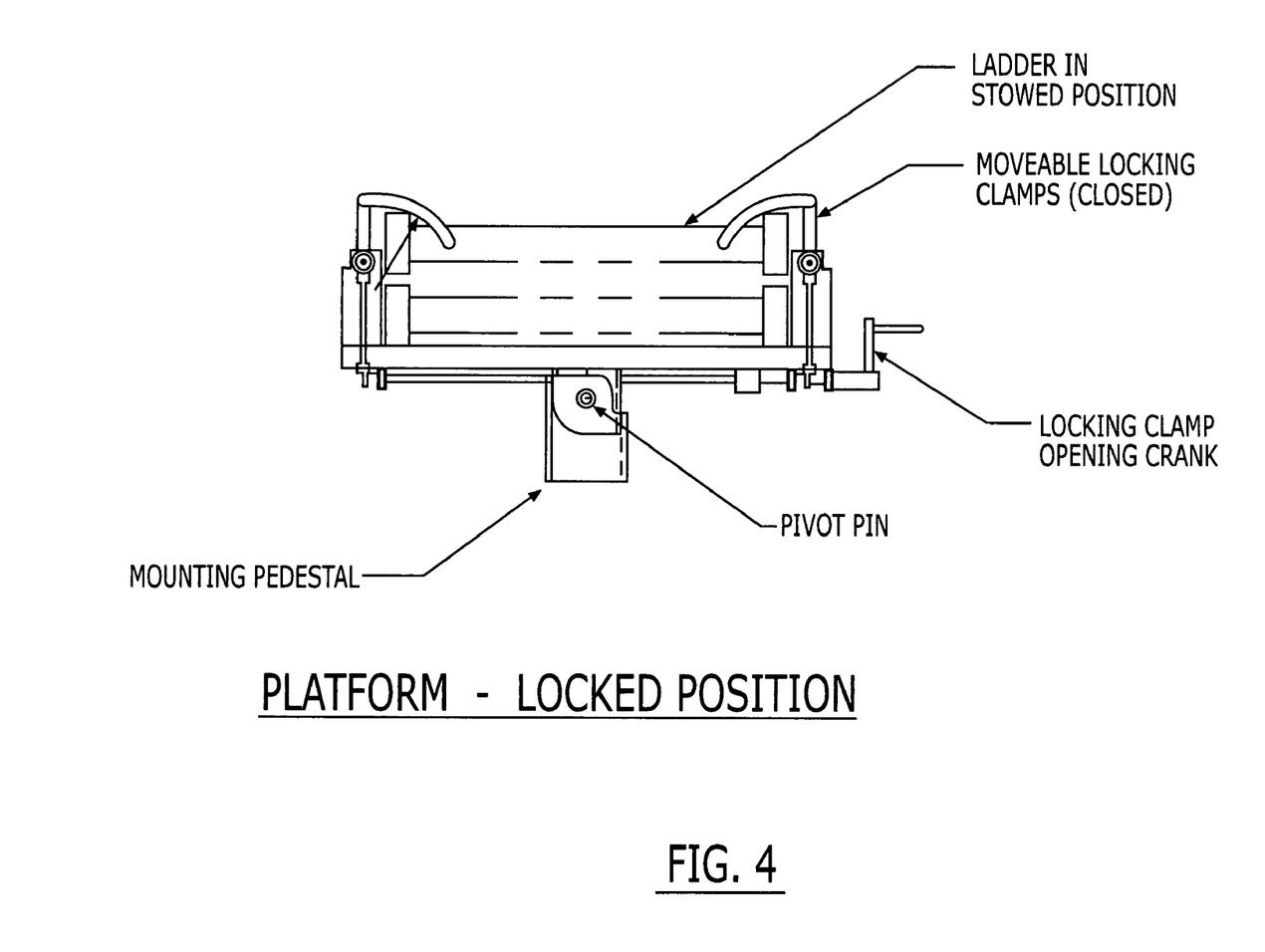
FIG. 4 is a rear elevational view of the apparatus in a locked position according to the present invention.
Figure 5:
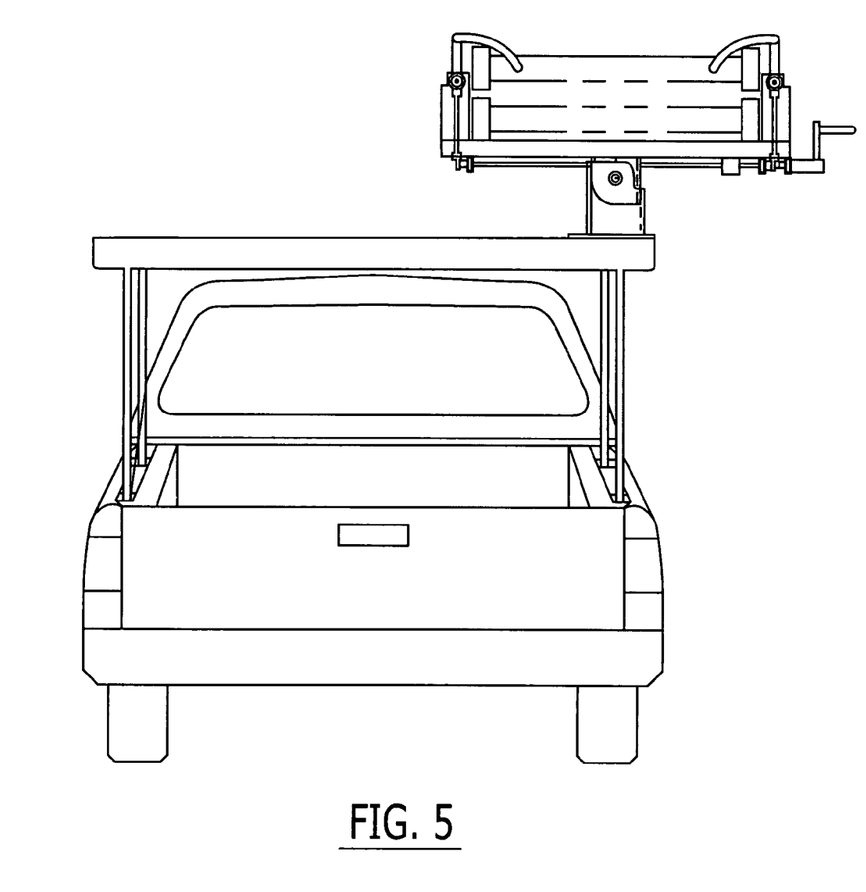
FIG. 5 is a view of an assembly of the apparatus in a locked position mounted on a truck.
Figure 6:
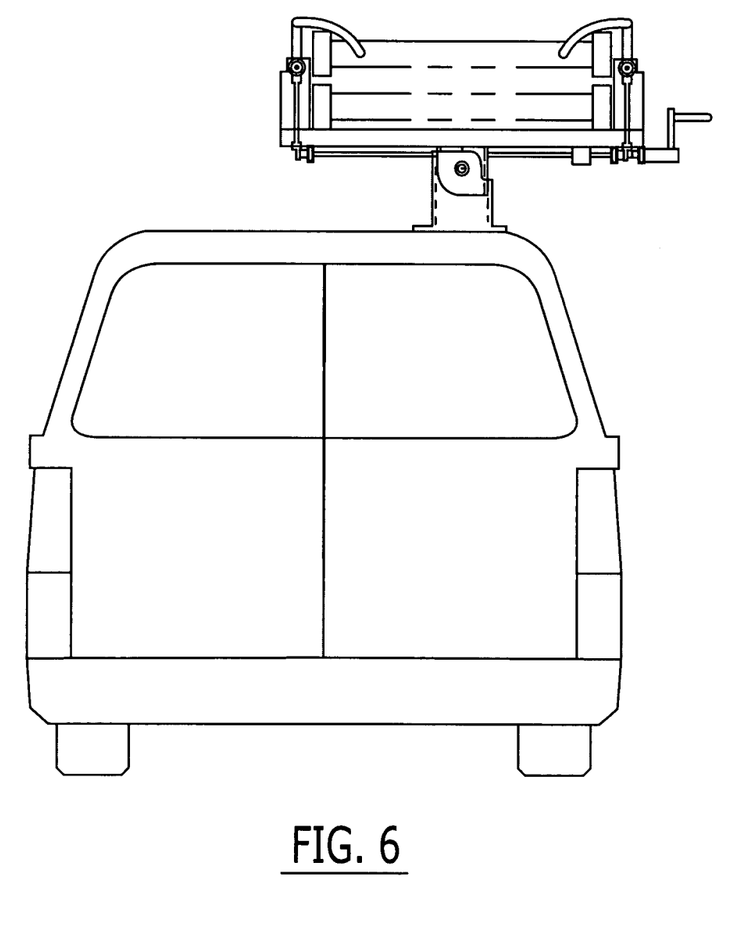
FIG. 6 is a view of an assembly of the apparatus in a locked position mounted on a van.
Figure 7:
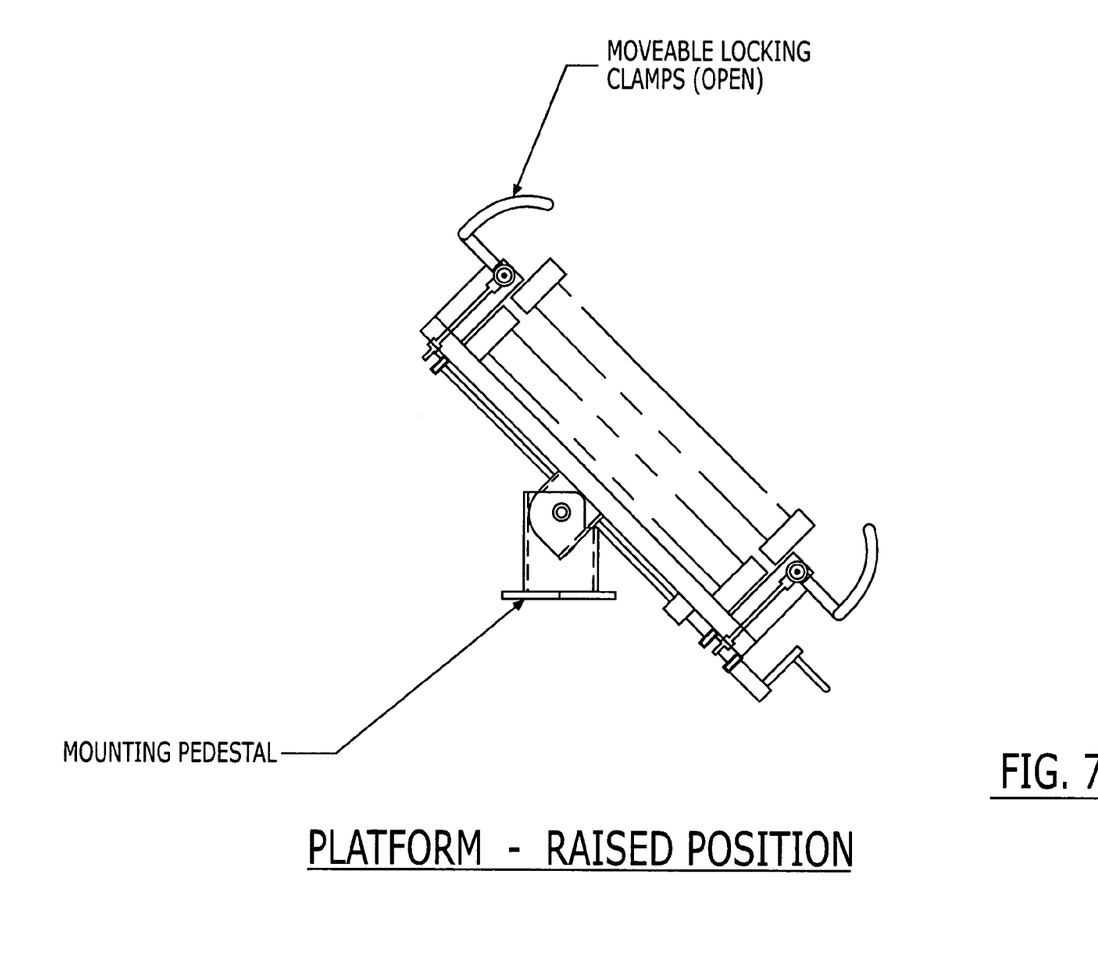
FIG. 7 is a rear elevational view of the apparatus in a raised position according to the present invention.
Figure 8:
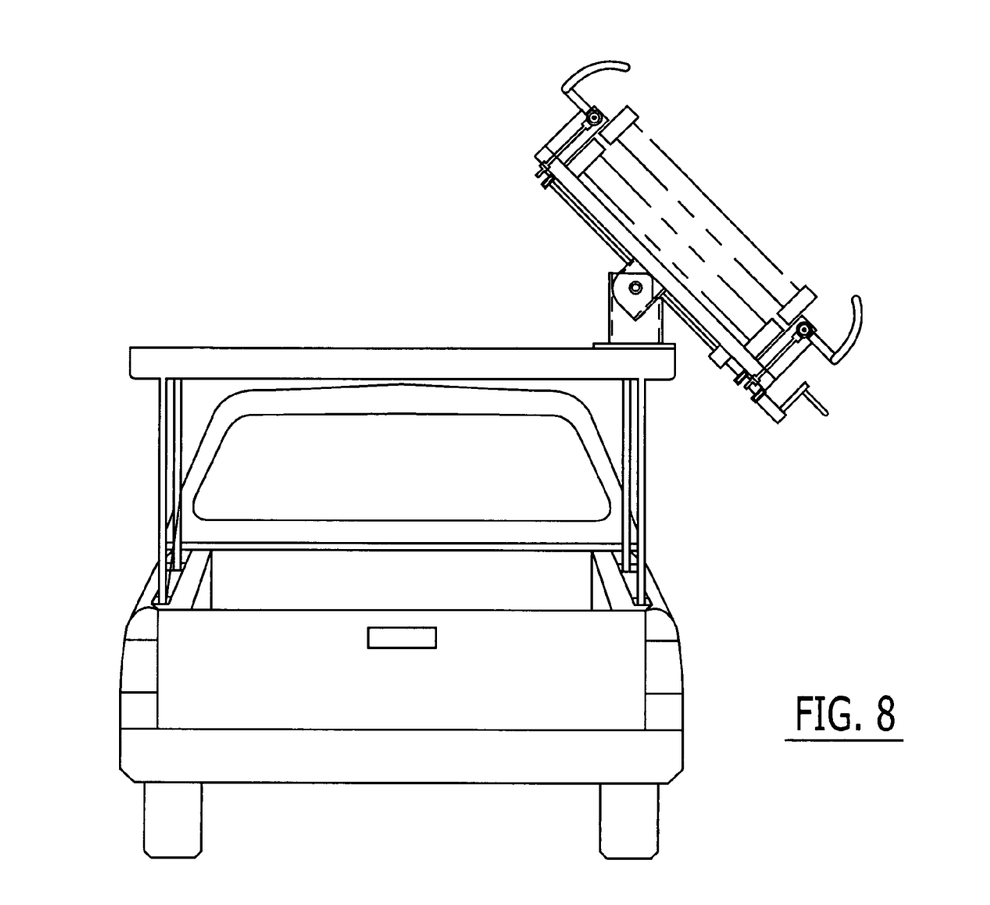
FIG. 8 is a view of an assembly of the apparatus in a raised position mounted on a truck.
Figure 9:
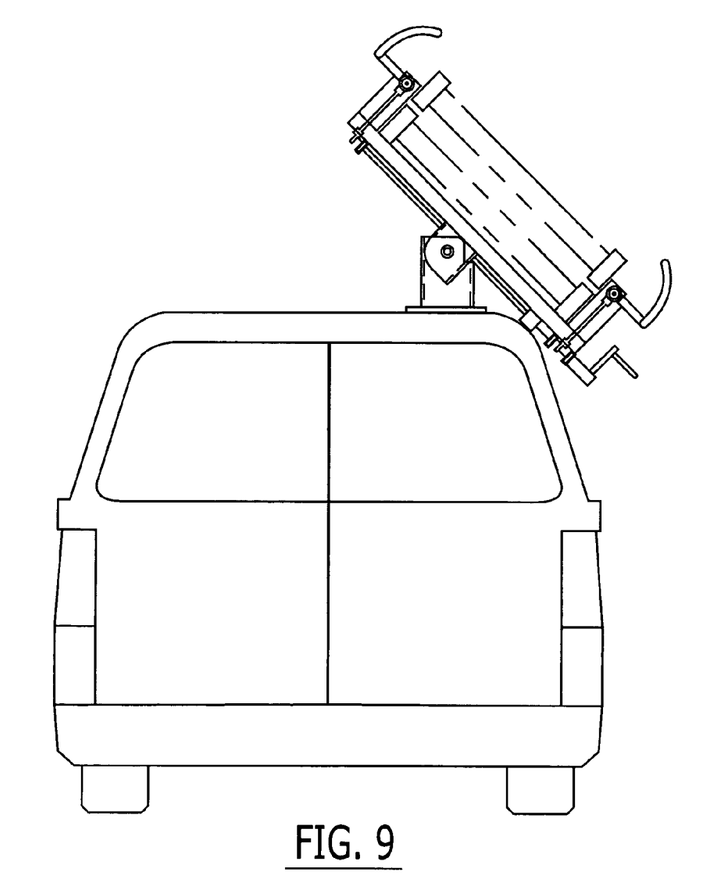
FIG. 9 is a view of an assembly of the apparatus in a raised position mounted on a van.

An assembly according to the present invention is shown in FIGS. 1 and 2. The apparatus includes a platform assembly 5 atop a vehicle 10 holding a ladder 15. Ladder 15 is held in place by clips 21, 22, 23, 24.

The platform assembly 5 includes guide pins 28, 29 which align ladder 15 on platform assembly 5. Such guide pins 28, 29 mounted on platform assembly 5 ensure stability and alignment as ladder 15 is carried on vehicle 10. Top surface 30 of vehicle 10 is ideally level.

Figure 10:
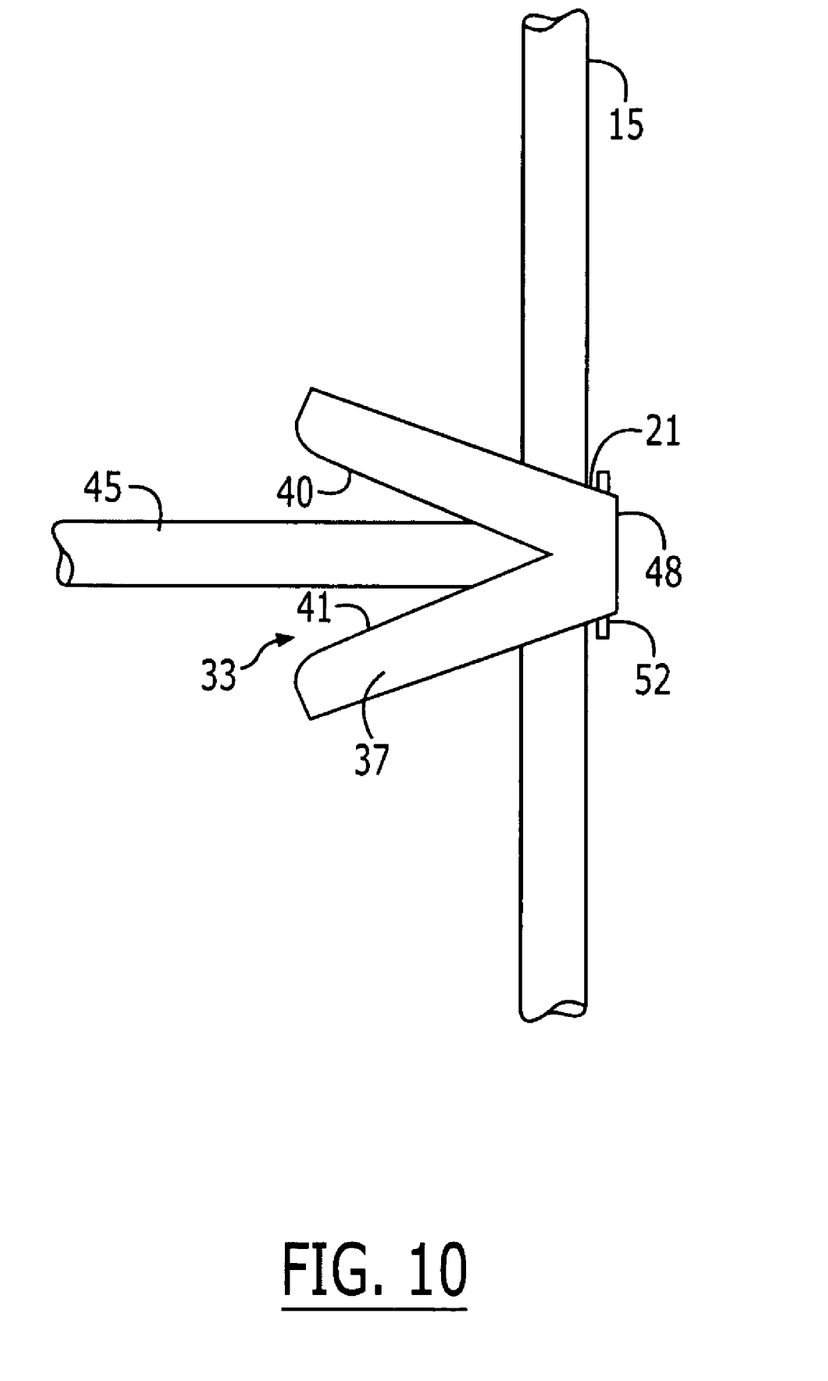
FIG. 10 is an illustration of a clip according to the present invention.

Referring to FIG. 10, clip 21 defines a generally elongated v-shaped opening 33. The tail portion 37 is preferably curved slightly and hooked downwardly, and the sides 40 and 41 thereof converge inwardly to form a notched claw. Thus, the opening 33 curves downwardly to grasp a rung 45 of ladder 15. Head 48 of clip 21 is attached to platform assembly 5 by hinged fixture 52 to enable such clip to rotate up from platform assembly 5 while inserting ladder 15 for carrying. Sides 40 and 41 securely hold rung 45 in a fashion similar to the claw end of a hammer holding a nail for removal.

Clips 21, 22, 23, 24 can be spring biased toward platform assembly 5 to hold ladder 15 firmly against platform assembly 5. In an alternate embodiment, clips 21, 22, 23, 24 can be locked in position by a pin or pawl assembly.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art could modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A rack for mounting a ladder to a vehicle for transport, such rack comprising:
   a. a base plate attached to said vehicle;
   b. a support post extending substantially vertical from said base plate; and
   c. a platform, comprising
      (1) at least one guide pin to align the ladder on said platform; and
      (2) at least one locking device, wherein:
         i. said at least one locking device comprises a v-shaped clip having two sides that converge inwardly to form a notch; and
         ii. a tail portion of said at least one clip is pivotable such that said at least one clip can rotate over a side rail of the ladder and each side of said at least one clip engages a rung of the ladder.

2. The rack of claim 1, wherein said at least one clip is curved.

3. The rack of claim 1, wherein said at least one clip is hooked downwardly.

4. The rack of claim 3, wherein said at least one clip forms a notched claw.

5. The rack of claim 1, said platform further comprising a hinged fixture to enable said at least one clip to rotate over the ladder while the ladder is being inserted on said platform.

6. The rack of claim 1, wherein said at least one clip engages the ladder substantially parallel to the rung and perpendicular to the side rail.

7. The rack of claim 1, said platform further comprising a spring associated with said at least one clip.

8. The rack of claim 7, wherein said spring biases said at least one clip toward said platform.

9. The rack of claim 1, said platform further comprising a locking mechanism to lock said at least one clip in position while said at least one clip engages the ladder.

10. The rack of claim 9, wherein said locking mechanism comprises a pin.

11. The rack of claim 9, wherein said locking mechanism comprises a pawl assembly.

12. The rack of claim 9, wherein said locking mechanism operates automatically.

* * * * *